(12) United States Patent
Post et al.

(10) Patent No.: US 9,685,843 B2
(45) Date of Patent: Jun. 20, 2017

(54) GROUNDING DEVICE FOR ELECTRIC MACHINE AND METHODS OF ASSEMBLING THE SAME

(71) Applicant: Regal Beloit America, Inc., Beloit, WI (US)

(72) Inventors: Steven W. Post, Cassville, MO (US); Shirish M. Vatkar, Tipp City, OH (US); Joseph A. Henry, Dayton, OH (US); Michael David Smith, Rogers, AR (US); Gerald R. Muehlbauer, Rib Mountain, WI (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 14/730,911

(22) Filed: Jun. 4, 2015

(65) Prior Publication Data

US 2015/0270761 A1    Sep. 24, 2015

Related U.S. Application Data

(63) Continuation-in-part of application No. 13/826,927, filed on Mar. 14, 2013, now Pat. No. 9,160,216.
(Continued)

(51) Int. Cl.
| | | |
|---|---|---|
| *H02K 11/00* | (2016.01) | |
| *H02K 11/40* | (2016.01) | |
| *H02K 5/173* | (2006.01) | |

(52) U.S. Cl.
CPC ....... *H02K 11/0089* (2013.01); *H02K 5/1735* (2013.01); *H02K 11/40* (2016.01); *Y10T 29/49012* (2015.01)

(58) Field of Classification Search
CPC ... H02K 11/046; H02K 11/0089; H02K 5/225
(Continued)

(56) References Cited

U.S. PATENT DOCUMENTS

| | | |
|---|---|---|
| 4,443,726 A | 4/1984 | Ikegami et al. |
| 5,988,996 A | 11/1999 | Brookbank et al. |

(Continued)

FOREIGN PATENT DOCUMENTS

| | | |
|---|---|---|
| DE | 102009004060 A1 | 7/2010 |
| DE | 202011106900 U1 | 2/2012 |

(Continued)

OTHER PUBLICATIONS

Extended European Search Report dated Aug. 25, 2016, Application No. 16166472.7-1809; Regal Beloit America, Inc., 8 pages.
(Continued)

*Primary Examiner* — Hanh Nguyen
(74) *Attorney, Agent, or Firm* — Armstrong Teasdale LLP

(57) ABSTRACT

A grounding device for an electric machine, having a rotating component and a stationary component, includes a core fabricated from a non-conductive material and a plurality of conductive fibers coupled to the core and extending therefrom. The plurality of conductive fibers are configured to electrically couple the rotating component with the stationary component such that an electrostatic charge on the rotating component is directed through the plurality of conductive fibers to the stationary component.

24 Claims, 7 Drawing Sheets

Related U.S. Application Data

(60) Provisional application No. 62/151,217, filed on Apr. 22, 2015.

(58) Field of Classification Search
USPC .................................................. 310/68 R
See application file for complete search history.

(56) References Cited

U.S. PATENT DOCUMENTS

| | | |
|---|---|---|
| 7,136,271 B2 | 11/2006 | Oh et al. |
| 8,169,766 B2 | 5/2012 | Oh et al. |
| 2007/0040459 A1 | 2/2007 | Oh |
| 2008/0258576 A1 | 10/2008 | Oh et al. |
| 2010/0001602 A1 | 1/2010 | Bossaller et al. |
| 2011/0216466 A1* | 9/2011 | Oh ..................... H02K 11/40 |
| | | 361/221 |
| 2012/0212875 A1 | 8/2012 | Oh et al. |
| 2013/0032373 A1 | 2/2013 | Cutsforth |

FOREIGN PATENT DOCUMENTS

| | | |
|---|---|---|
| DE | 202014105015 U1 | 10/2014 |
| EP | 1460885 A1 | 9/2004 |
| EP | 1755207 A2 | 2/2007 |
| EP | 2075820 A2 | 7/2009 |
| EP | 2779378 A2 | 9/2014 |
| JP | 60062847 | 4/1985 |

OTHER PUBLICATIONS

European Search Report, Application No. 14158994.5, dated Jul. 14, 2015, pp.

\* cited by examiner

GROUNDING DEVICE FOR ELECTRIC MACHINE AND METHODS OF ASSEMBLING THE SAME

CROSS REFERENCE TO RELATED APPLICATIONS

This application is a Continuation-In-Part of pending U.S. patent application Ser. No. 13/826,927 filed Mar. 14, 2013 and also claims priority to U.S. Provisional Application No. 62/151,217 filed Apr. 22, 2015, both of which are hereby incorporated by reference in its entirety.

BACKGROUND OF THE INVENTION

The field of the invention relates generally to grounding devices and, more particularly, to grounding devices for electric machines having stray electrostatic charges on a rotatable shaft.

At least some known electric machines, such as brushless alternating current (BLAC) permanent magnet motors, are driven by pulse width modulation (PWM) technology and create a capacitance charge between the coils and the rotor. This capacitance charge results in substantially induced currents in the motor shaft.

Other known electric machines such as three-phase motors are driven by variable speed drives that induce a voltage or electrostatic charge on the motor shaft. Some variable speed drives utilize pulse width modulation technology to vary the speed of AC motors, which allows use of less expensive AC motors in applications where more expensive DC motors are used. A drawback of the use of AC motors with variable speed drives is that higher common mode voltage (CMV) is generated by the variable speed drive, which may increase induced currents on the shaft.

In some known motors, voltage or charges on the motor shaft induces current flow through the shaft bearings to the motor frame and then to ground. While the motor is running, the bearings become more resistive to current flow, causing a buildup of charge on the shaft surfaces. Over a short period of time, electrical charges can build up to a high level. As the electrical charges pass the threshold level of the least electrically resistant path, such as through the ball bearings on the shaft, a discharge of electrical energy passes through the least resistant path. This discharge causes electric discharge machining, which can affect the surfaces of the bearing races and the balls in the bearing if the least resistant path is through the bearings. This discharge may create fusion craters, and particulate matter from the crater formation may remain inside the sealed bearing. Both the fusion crater and the particulate material in the bearing act to disturb the free flow rotation of the bearing, which may reduce the operating lifetime of the bearing and/or the electric machine.

A number of mitigation technologies have been used to overcome this problem. The technologies include conductive bearing grease, insulating the bearings, and using various brushes made of metal or other materials to ground the shaft. Such brushes are typically mounted in rigid holders and may be expensive and require lengthy installation procedures. Moreover, the brushes are mounted to the exterior of the motor and therefore exposed to the environment surrounding the motor.

BRIEF DESCRIPTION OF THE INVENTION

In one aspect, a grounding device for an electric machine having a rotating component and a stationary component is provided. The grounding device includes a core and a plurality of conductive fibers coupled to the core and extending therefrom. The plurality of conductive fibers are configured to electrically couple the rotating component with the stationary component such that an electrostatic charge on the rotating component is directed through the plurality of conductive fibers to the stationary component.

In another aspect, an electric machine is provided. The electric machine includes a rotating component, a stationary component coupled to a ground, and a grounding device conductively coupled between the rotating component and the stationary component. The grounding device includes a core and a plurality of conductive fibers coupled to the core and extending therefrom. The plurality of conductive fibers are configured to electrically couple the rotating component with the stationary component such that an electrostatic charge on the rotating component is directed through the plurality of conductive fibers to the stationary component.

In yet another aspect, a method of assembling an electric machine is provided. The method includes providing a rotating component, coupling a stationary component to a ground, and positioning a grounding device between the rotating component and the stationary component. The grounding device includes a core and a plurality of conductive fibers coupled to the core and extending therefrom. At least a portion of the plurality of conductive fibers are configured to electrically couple the rotating component with the stationary component such that an electrostatic charge on the rotating component is directed through the plurality of conductive fibers to the stationary component.

DETAILED DESCRIPTION OF THE INVENTION

Electrostatic charges are likely to build on rotating components of electric machines. These charges often travel through the bearings used to support the rotating parts of the machines and reduce the operating lifetime of the bearings. Grounding devices may be used to bleed the electrostatic charge to a ground. One such grounding device includes a core and a plurality of conductive fibers coupled to the core such that the fibers extend therefrom. The plurality of conductive fibers are configured to electrically couple the rotating component with a stationary component of the electric machine such that the electrostatic charge on the rotating component is directed through the plurality of conductive fibers, to the stationary component, and to the ground. As such, the grounding device described herein substantially prevents bearing arcing and increases the service lifetime of the electric machine.

Figure 1:
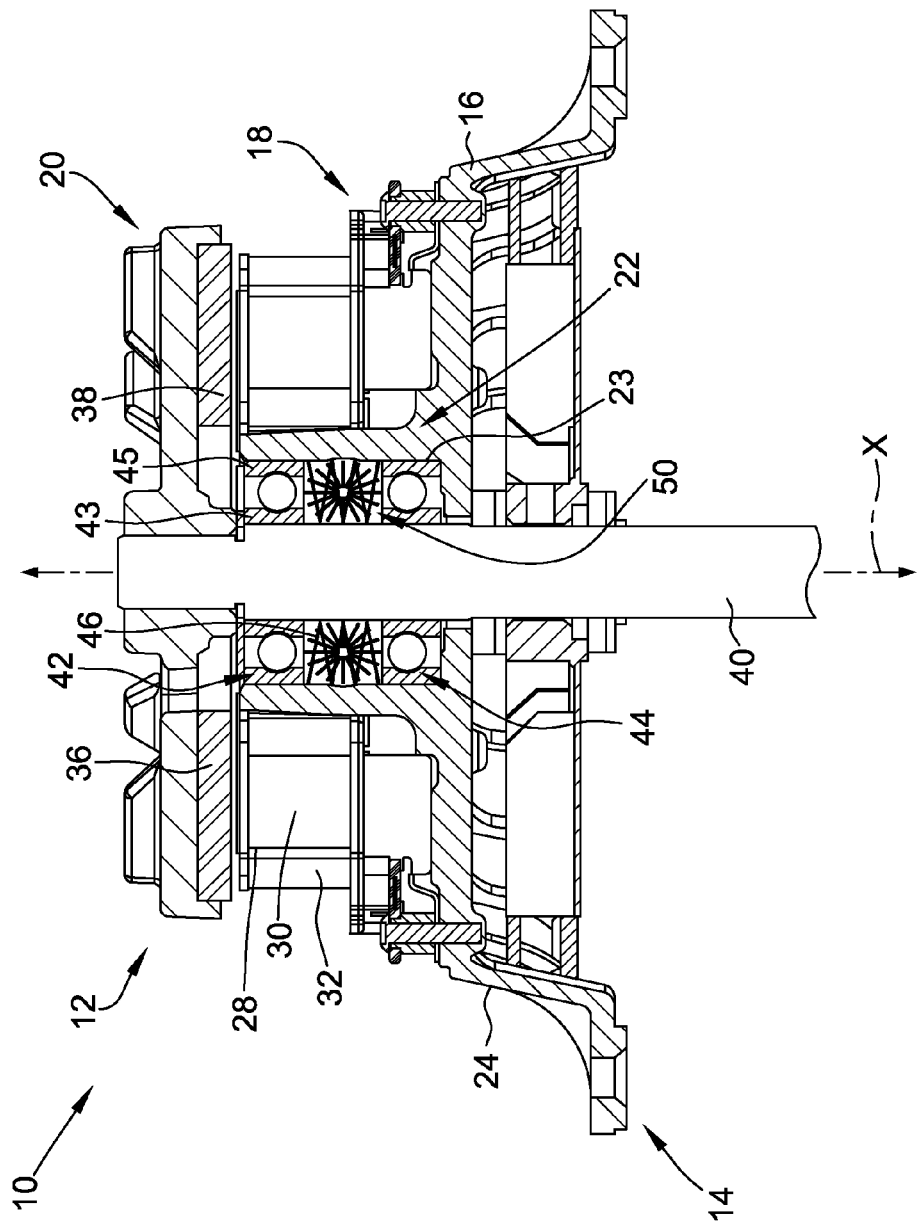
FIG. 1 is a cross-sectional side view of an exemplary electric machine.
Figure 2:
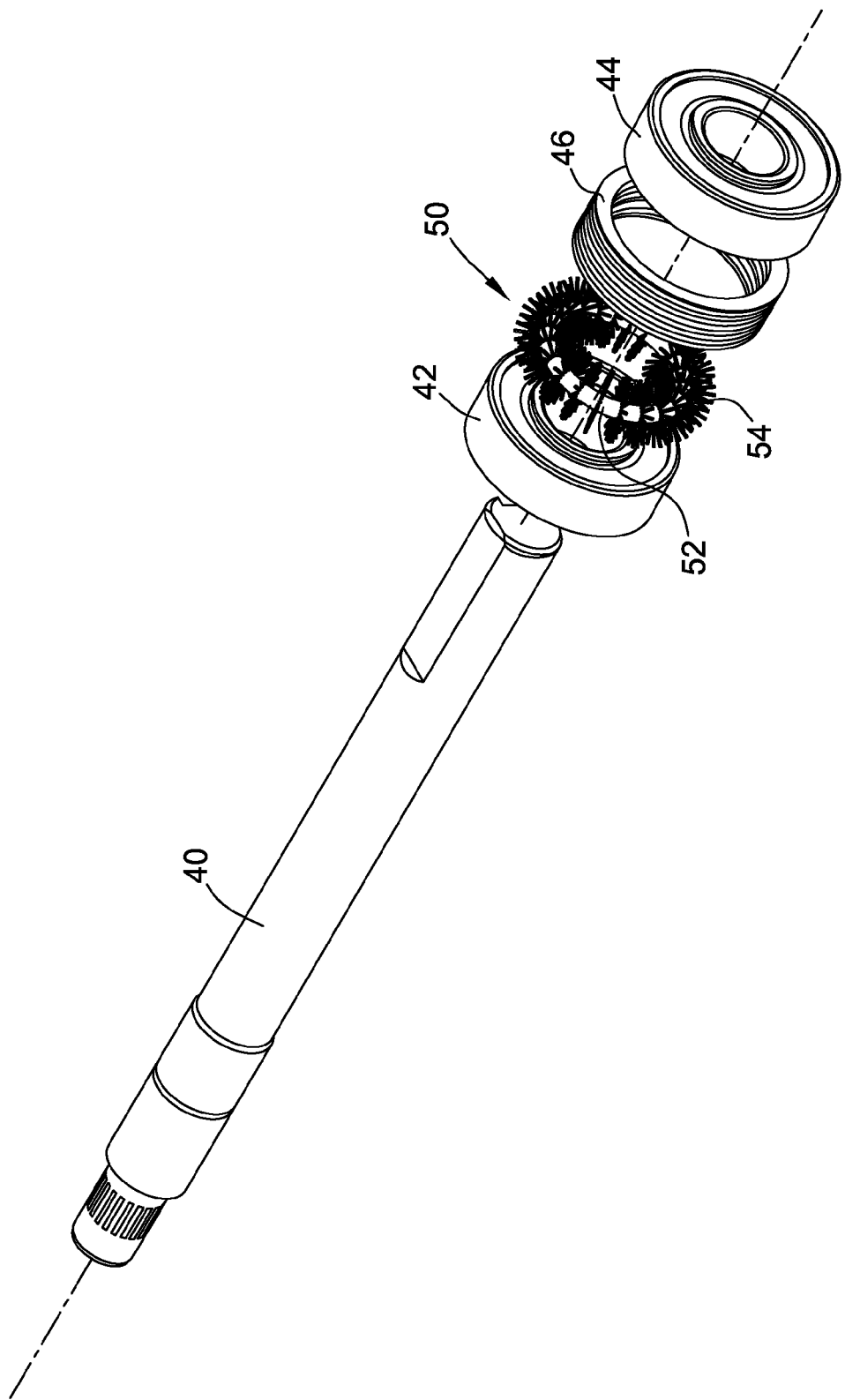
FIG. 2 is an exploded view of selected components of the electric machine shown in FIG. 1.

FIG. 1 is a cross-sectional side view of an exemplary electric machine 10 that may be operated as either a generator or a motor. FIG. 2 is an exploded view of selected components of electric machine 10. In the exemplary embodiment, electric machine 10 is coupled to a fan or centrifugal blower (not shown) for moving air through an air handling system, for blowing air over cooling coils, and/or for driving a compressor within an air conditioning/refrigeration system. More specifically, machine 10 may be used in air moving applications used in the heating, ventilation, and air conditioning (HVAC) industry, for example, in residential applications using ⅕ horsepower (hp) to 1 hp motors. Alternatively, machine 10 is used in fluid pumping applications. Machine 10 may also be used in commercial and industrial applications and/or hermetic compressor motors used in air conditioning applications, where machine 10 has a rating of greater than 1 hp. Although described herein in the context of an air handling system, electric machine 10 may engage any suitable work component and be configured to drive such a work component.

Electric machine 10 includes a first end 12, a second end 14, and an assembly housing 16. Electric machine 10 also includes a stationary assembly 18 and a rotatable assembly 20. Assembly housing 16 defines an interior 22 and an exterior 24 of machine 10 and is configured to at least partially enclose and protect stationary assembly 18 and rotatable assembly 20. Stationary assembly 18 includes a stator core 28, which includes a plurality of teeth 30 and a plurality of windings 32 wound around stator teeth 30. In the exemplary embodiment, stationary assembly 18 is a three-phase stator assembly and is one of a round, segmented, soft magnetic composite, or roll-up type stator construction. Alternatively, stationary assembly 18, and more specifically, stator core 28, is formed from a stack of laminations made of highly magnetically permeable material and windings 32 are wound on stator core 28 in any suitable manner that enables machine 10 to function as described herein.

Rotatable assembly includes a permanent magnet rotor core 36, having a plurality of permanent magnets 38, or a single magnet having a plurality of poles, and a shaft 40 supported by a first bearing 42 and a second bearing 44. Bearings 42 and 44 are separated by a spring mechanism 46 and each include an inner race 43 and an outer race 45. In the exemplary embodiment, bearings 42 and 44 and spring mechanism 46 are housed in a bore 23 formed in housing 16 and substantially circumscribe shaft 40. In the exemplary embodiment, rotor core 36 is a solid core fabricated from a soft magnetic composite. Alternatively, rotor core 36 is formed from a stack of laminations made of magnetically permeable material. Rotor core 36 is substantially received in a central bore of stator core 28 for rotation along an axis of rotation X. While FIG. 1 is an illustration of a three-phase electric machine, the methods and apparatus described herein may be included within machines having any number of phases.

Figure 4:
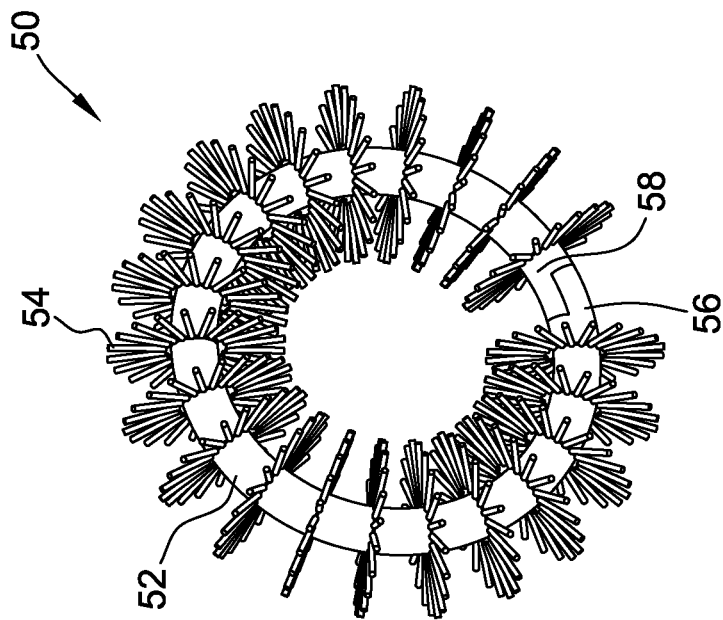
FIG. 4 is a perspective view of the grounding device shown in FIG. 3.
Figure 3:
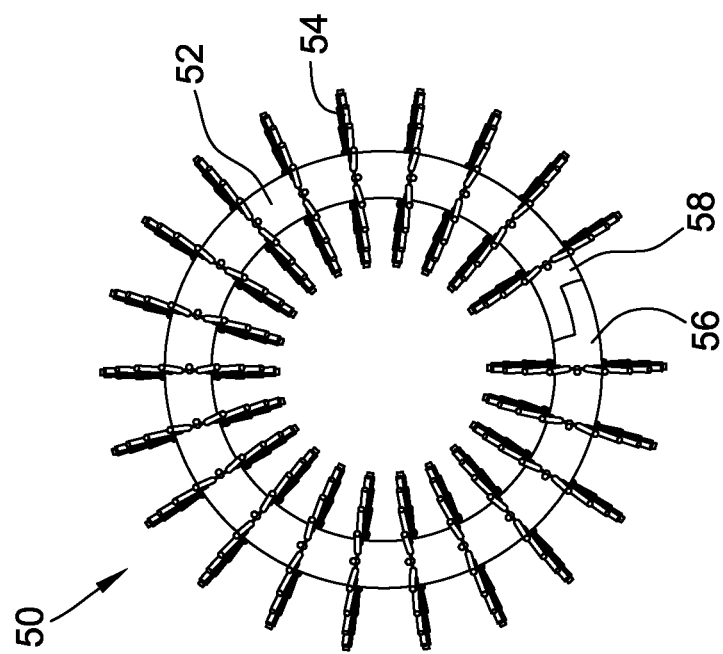
FIG. 3 is a top view of an exemplary grounding device that may be used with the electric machine shown in FIG. 1.

FIG. 3 is a top view of an exemplary grounding device 50 that may be used with electric machine 10 (shown in FIG. 1). FIG. 4 is a perspective view of grounding device 50. In the exemplary implementation, as shown in FIG. 1, grounding device 50 positioned about shaft 40 and generally includes a core 52 and a plurality of semi-conductive or conductive fibers 54 extending therefrom. In the exemplary embodiment, grounding device 50 is rotatably stationary and in conductive contact with and/or grounded to a non-rotating component of electric machine 10, such as at least one of housing 16, bearing outer race 45, and spring mechanism 46. Alternatively, grounding device 50 contacts any non-rotating component of machine 10 that enables grounding device 50 to function as described herein. For example, grounding device 50 may be positioned proximate a machine bracket (not shown), machine foot (not shown), bearing bore (not shown), machine frame (not shown), and/or stator core 28.

In the exemplary embodiment, core 52 includes a first end 56 and a second end 58 and is formed from an electrically conductive wire. For example, core 52 is fabricated from steel, copper, brass, and/or other metals. Alternatively, core 52 is fabricated from an electrically non-conductive material, such as, but not limited to, plastic. Generally, core 52 is formed from any suitable material that enables grounding device 50 to function as defined herein. In the exemplary embodiment, core 52 is fabricated from a formable material and is curved to form a loop such that ends 56 and 58 are coupled together. Alternatively, core 52 is a continuously-formed circular ring that does not include ends 56 and 58. Although grounding device 50 is shown as a substantially circular loop in the accompanying figures, it is understood that grounding device 50 may also be arc-shaped, that is, only a portion of a circle. Additionally, grounding device 50 may include one or more arc-shaped segments or substantially spherical elements. Generally, grounding device 50 has any shape that enables usage as described herein.

In the exemplary embodiment, fibers 54 are electrically conductive fibers that relay current build up from a rotating portion of machine 10 to a ground. For example, fibers 54 are fabricated from steel, copper, brass, and/or other metals. Alternatively, fibers 54 are fabricated from a non-conductive material and include a conductive coating, such as carbon fiber or copper. Generally, fibers 54 are fabricated from any suitable flexible, electrically conductive or semi-conductive material that enables grounding device 50 to function as described herein. For example, fibers 54 are fabricated from copper and/or carbon fiber.

In the exemplary embodiment, fibers 54 are spirally wound on core 52 and may have any suitable length. Alternatively, fibers 54 are coupled to core 52 in any suitable pattern that enables grounding device 50 to function as defined herein. In the exemplary embodiment, fibers 54 extend approximately 360° about core 52. In an alternative embodiment, fibers 54 extend approximately 180° about core 52. In yet another alternative embodiment, fibers 54 extend between approximately 60° and approximately 90° about core 52. However, fibers 54 may extend about core 52 in any suitable pattern that enables grounding device 50 to function as described herein.

As shown in FIG. 1, grounding device 50 is positioned about shaft 40 in bore 23 within housing interior 22 such that grounding device 50 is contained within electric machine 10 and is not exposed to the surrounding environment. As such, grounding device 50 is not exposed to moisture or particulate matter (dust, dirt, debris) that may reduce the service lifetime of grounding device 50. More specifically, grounding device 50 is positioned between bearings 42 and 44 and substantially radially inward of spring mechanism 46. Alternatively, grounding device 50 is positioned at any location within bore 23 and is not limited to being positioned between bearings 42 and 44. In the exemplary implementation, grounding device 50 is positioned such that at least a portion of the plurality of fibers 54 contact a rotating component, such as but not limited to shaft 40, and a stationary component, such as but not limited to housing 16, outer race 45, and spring mechanism 46. Specifically, at least a portion of fibers 54, such as fibers 54 on a radially outward portion of grounding device 50, extend through, and contact, spring mechanism 46 and may also contact housing 16 and/or outer race 45. Alternatively, grounding device 50 is positioned about shaft 40 such that at least a portion of the plurality of fibers 54 are within a close proximity of shaft 40 such that an electrostatic charge on shaft 40 can be electrically discharged to fibers 54 (i.e., fibers 54 are electrically coupled to shaft 40, but not in direct contact with shaft 40). Alternatively, at least a portion of fibers 54 are in contact with any rotating component of electric machine 10. For example, fibers 54 may contact a surface of rotor core 36, rotor end rings (not shown), and/or a fan or hub (not shown) mounted to shaft 40. Generally, grounding device 50 is positionable within electric machine 10 in any suitable location that enables grounding device 50 to bleed an electric charge from a rotating component to a stationary grounding component.

In operation of electric machine 10, an electrostatic charge is produced on a rotating component of electric machine, such as shaft 40. Grounding device 50 is positioned within bore 23 such that fibers 54 contact shaft 40. Electrically conductive fibers 54 facilitate bleeding the electrostatic charge from shaft 40, through fibers 54, and to housing 16. Housing 16 one of serves as the ground or is electrically coupled to a ground and effectively transfers the electrostatic charge out of electric machine 10 to the ground. In operation, fibers 54 proximate shaft 40, on a radially inner portion of grounding device 50, conduct the electrostatic charge from shaft 40 and/or inner race 43 and transfers the charge into fibers 54 proximate housing 16, on a radially outer portion of grounding device. The path of the electrostatic charge may pass from fibers 54 through any combination of spring mechanism 46, outer race 45, and housing 16. As such, the plurality of conductive fibers 54 are operable to both conduct the electrostatic charge away from the rotating component of electric machine 10, and to ground the charge by contacting a stationary component of electric machine 10. Furthermore, because at least one of fibers 54 contacts at least one of spring mechanism 46, housing 16, and outer race 45, the electrostatic charge is grounded through any of these components. As such, grounding device 50 grounds the electrostatic charge from shaft 40 through the plurality of conductive fibers 54 rather than through core 52. In embodiments where core 52 is electrically conductive, at least a portion of the electrostatic charge is conducted through core 52 between the radially inner fibers 54 and radially outer fibers 54. In embodiments where core 52 is electrically non-conductive, the electrostatic charge travels through only fibers 54 to transfer the charge into housing 16.

Figure 5:
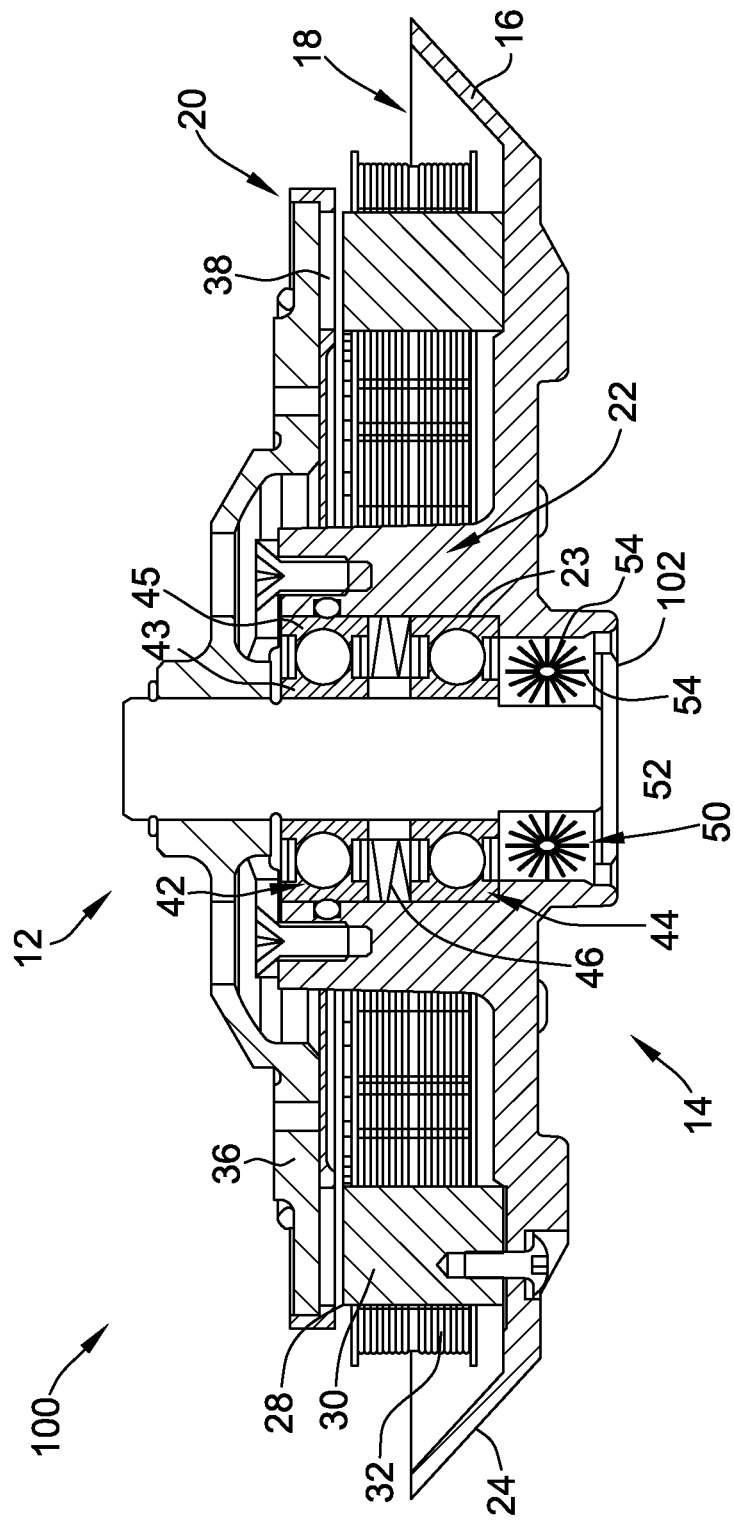
FIG. 5 is a cross-sectional side view of another suitable embodiment of an electric machine having a grounding device.
Figure 6:
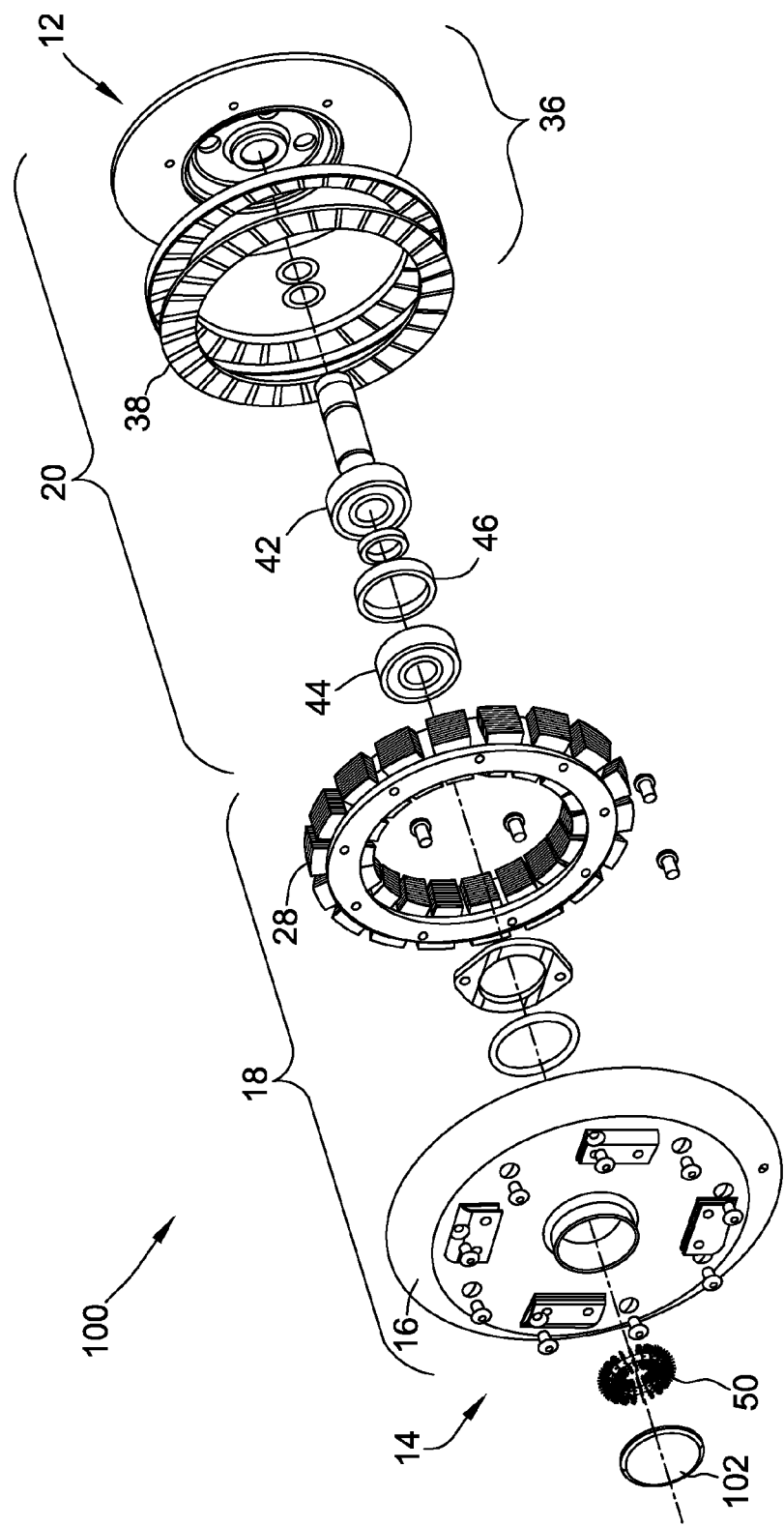
FIG. 6 is an exploded view of the electric machine shown in FIG. 5.

FIG. 5 is a cross-sectional side view of another suitable embodiment of an electric machine 100 having grounding device 50, and FIG. 6 is an exploded view of electric machine 100. Electric machine 100 is substantially similar to electric machine 10 (shown in FIG. 1) in operation and composition, with the exception that electric machine 100 does not include a shaft and grounding device 50 is positioned proximate the second end 14 of machine 100 outward from bearings 42 and 44. As such, grounding device 50 is not positioned between bearings 42 and 44 in electrical machine 100. Although FIG. 5 illustrates grounding device 50 positioned outward from bearings 42 and 44, such that bearings 42 and 44 are between grounding device 50 and rotating assembly 20, grounding device 50 may also be positioned inward of bearings 42 and 44 such that bearings 42 and 44 are positioned between grounding device 50 and stationary assembly 18. In one embodiment, grounding device 50 contacts one bearing 42 (FIG. 5) or both bearings 42 and 44 (FIG. 1). Alternatively, grounding device 50 does not contact either of bearings 42 or 44.

As shown in FIG. 5, grounding device 50 is positioned such that at least a portion of the plurality of fibers 54 contact a rotating component, such as but not limited to inner race 43, and a stationary component, such as but not limited to housing 16 and outer race 45. In operation, the electrostatic charge from the rotating component is conducted into fibers 54 proximate thereto and transferred into fibers 54 proximate the stationary component. The path of the electrostatic charge may pass from fibers 54 through any combination of outer race 45 and housing 16. As such, the plurality of conductive fibers 54 are operable to both conduct the electrostatic charge away from the rotating component of electric machine 10, and to ground the charge by contacting a stationary component of electric machine 10. In the embodiment shown in FIGS. 5 and 6, electric machine 100 also includes a dust cap 102 coupled to housing 16 at second end 14. Dust cap 102 prevents or at least substantially reduces an amount of particulate matter and moisture from entering housing interior 22 and collecting proximate grounding device 50.

Figure 7:
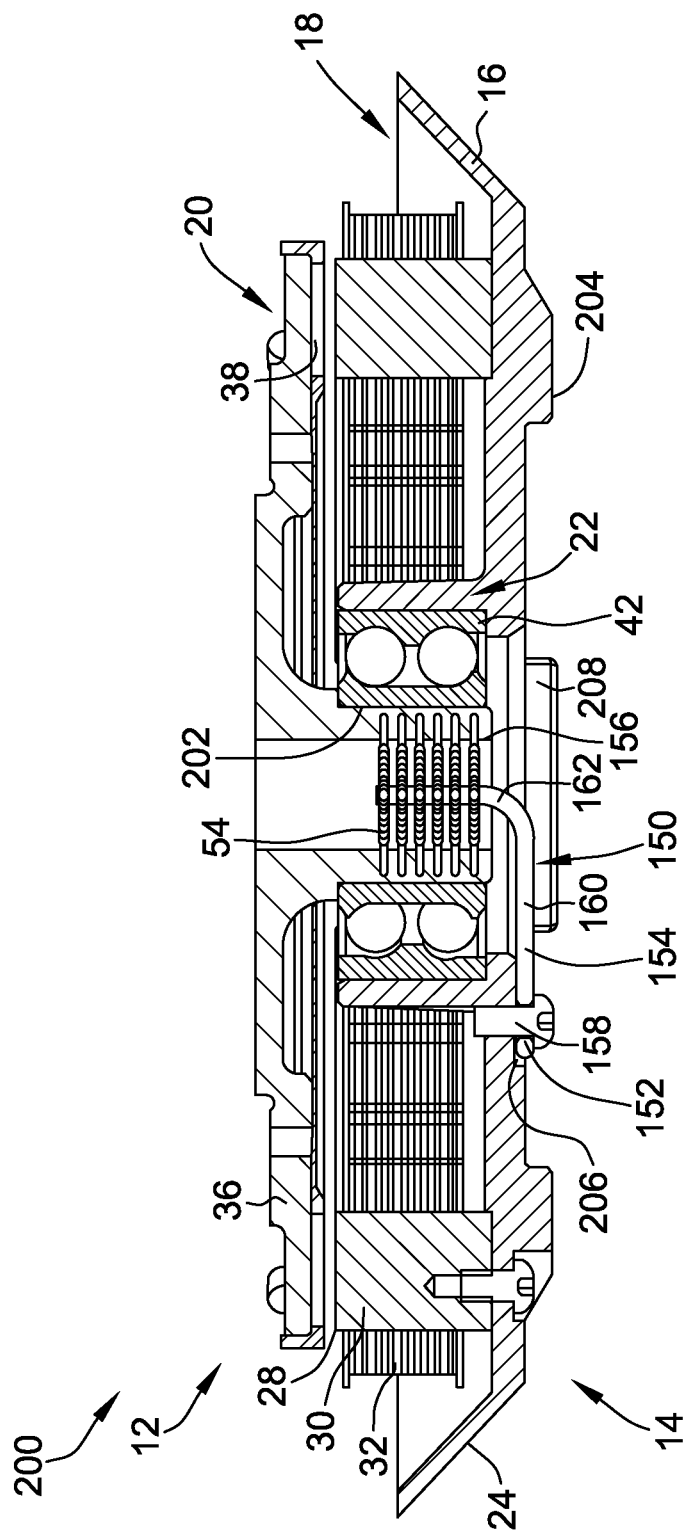
FIG. 7 is a cross-sectional side view of another suitable embodiment of an electric machine having a grounding device.
Figure 8:
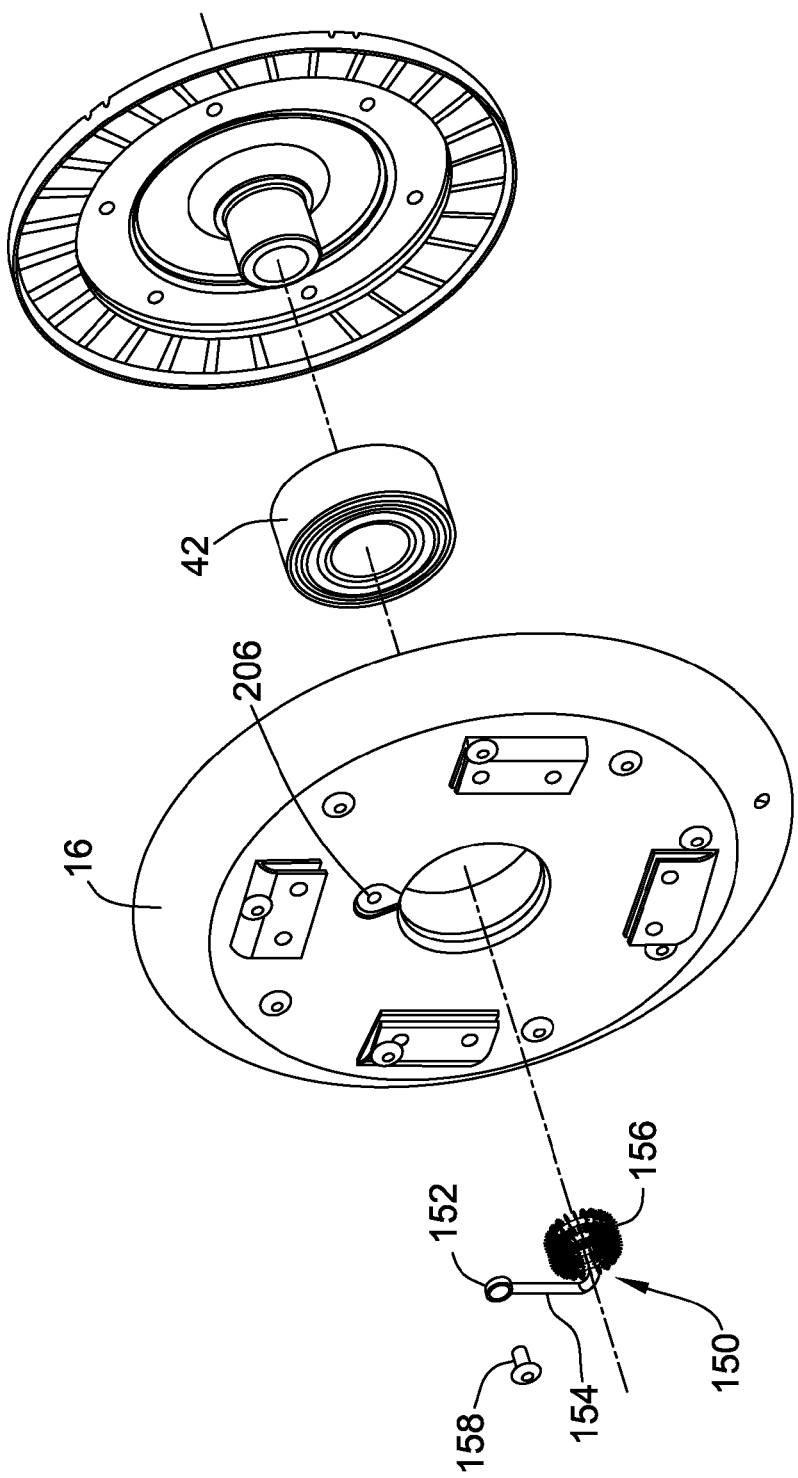
FIG. 8 is an exploded view of selected components of the electric machine shown in FIG. 5.

FIG. 7 is a cross-sectional side view of another suitable embodiment of an electric machine 200 having a grounding device 150, and FIG. 8 is an exploded view of selected components of electric machine 200. Electric machine 200 is substantially similar to electric machine 100 (shown in FIG. 5) in operation and composition, with the exception that electric machine 200 includes only a single bearing 42 and no spring mechanism. Furthermore, in electric machine 200, grounding device 150 is positioned within a central opening 202 defined by rotor core 36.

In the embodiment shown in FIGS. 7 and 8, grounding device 150 includes an eye 152, a core 154 extending from eye 152, and a plurality of fibers 156 extending from an end of core 154. Core 154 and fibers 156 are both formed from an electrically conductive material. For example, core 154 and fibers 156 are fabricated from steel, copper, brass, and/or other metals. Alternatively, core 154 and fibers 156 are fabricated from a non-conductive material and include a conductive coating, such as carbon fiber or copper. Generally, fibers 156 are fabricated from any suitable flexible, electrically conductive or semi-conductive material that enables grounding device 150 to function as described herein. In the embodiment shown in FIGS. 7 and 8, core 154 includes a first portion 160 coupled to housing 16 and a second portion 162 that extends into central opening 202 such that portions 160 and 162 are perpendicular to each other. Fibers 156 extend from second portion 162 within opening 202.

A fastener 158 is used to couple grounding device 150 to an exterior surface 204 of housing 16. Specifically, surface 204 includes a groove 206 that receives at least one of eye 152 and first portion 160 of core 154. Fibers 156 extend perpendicularly from second portion 162 of core 154 into central opening 202 of rotor core 36. Similar to electric machine 100, electric machine 200 also includes a dust cap 208 that substantially covers opening 202.

In operation of electric machine 200, an electrostatic charge is produced on a rotating component of electric machine 200, such as rotor core 36. Grounding device 150 is positioned within electric machine 200 such that fibers 156 contact the portion of rotor core 36 that forms central opening 202. Electrically conductive fibers 156 facilitate bleeding the electrostatic charge from rotor core 36 into housing 16. Housing 16 may be electrically coupled to a ground and effectively transfers the electrostatic charge out of electric machine 10 to the ground.

Systems and methods for grounding an electrostatic charge on a rotating component of an electric machine are provided herein. The system includes a grounding device that is coupleable to the electric machine and transfers the electrostatic charge from a rotating component of the electric machine to a stationary component to prevent the charge from traveling through the bearings. The device includes a core and a plurality of electrically conductive fibers that bleed the electrostatic charge from the rotating component to the stationary component. The device is positioned within the electric machine such that the device floats about a shaft or within a bore. That is, the device, in one embodiment, is not positively attached to a component of the electric machine, but is positioned within the machine such that the device contacts the rotating component and the stationary component. Accordingly, the grounding device described herein is a simple and inexpensive component that is quickly and easily installed on the electric machine. Furthermore, the grounding device is housed within the electric machine such that the device is protected from exposure to moisture or particulate matter from the outside environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A grounding device for an electric machine having a rotating component and a stationary component, said grounding device comprising:
    a core; and
    a plurality of conductive fibers coupled to said core and extending therefrom such that at least one conductive fiber of said plurality of conductive fibers contacts the rotating component and such that at least one conductive fiber of said plurality of conductive fibers contacts the stationary component, said plurality of conductive fibers configured to electrically couple the rotating component with the stationary component such that an electrostatic charge on the rotating component is directed through said plurality of conductive fibers to the stationary component.

2. The grounding device in accordance with claim 1, wherein said core and said plurality of conductive fibers are positioned within a bore formed in the stationary component.

3. The grounding device in accordance with claim 1, said core and said plurality of conductive fibers are positioned radially inward of a spring mechanism, wherein at least one conductive fiber of said plurality of conductive fibers contacts the spring mechanism and is electrically coupled with the stationary component.

4. The grounding device in accordance with claim 1, wherein said core comprises a first portion coupled to the stationary component and a second portion positioned within an opening defined by the rotating component, wherein said plurality of conductive fibers are coupled to said second portion.

5. The grounding device in accordance with claim 1, wherein said core is fabricated from an electrically non-conductive material.

6. The grounding device in accordance with claim 1, wherein said core comprises at least one of a substantially circular shape, at least one arc-shaped segment, and at least one substantially spherical element.

7. The grounding device in accordance with claim 1, wherein at least one of said core and said plurality of conductive fibers is flexible.

8. An electric machine comprising:
    a rotating component;
    a stationary component coupled to a ground; and
    a grounding device conductively coupled between said rotating component and said stationary component, wherein said grounding device comprises:
    a core; and
    a plurality of conductive fibers coupled to said core and extending both radially inward from and radially outward from said core, wherein said plurality of conductive fibers are configured to electrically couple said rotating component with said stationary component such that an electrostatic charge on said rotating component is directed through said plurality of conductive fibers to said stationary component.

9. The electric machine in accordance with claim 8, wherein said rotating component comprises at least one of a shaft, a bearing inner race, and a rotor core.

10. The electric machine in accordance with claim 8, wherein said stationary component comprises at least one of a housing, a spring mechanism, a bearing outer race, and a stator.

11. The electric machine in accordance with claim 8 further comprising
    at least one bearing comprising an inner race and an outer race;
    a housing comprising a bore formed therein, wherein said at least one bearing and said grounding device are positioned within said bore.

12. The electric machine in accordance with claim 11, wherein said grounding device is positioned proximate said at least one bearing such that said plurality of conductive fibers contact said inner race and at least one of said outer race and said housing.

13. The electric machine in accordance with claim 11, wherein said grounding device does not contact said at least one bearing.

14. The electric machine in accordance with claim 8, wherein said core is fabricated from an electrically non-conductive material.

15. The electric machine in accordance with claim 8, wherein said core comprises at least one of a substantially circular shape, at least one arc-shaped segment, and at least one substantially spherical element.

16. The electric machine in accordance with claim 8, wherein said stationary component comprises a bore formed therein, wherein said core and said plurality of conductive fibers are positioned within said bore.

17. A method of assembling an electric machine, said method comprising:
    providing a rotating component;
    coupling a stationary component to a ground; and
    positioning a grounding device between the rotating component and the stationary component, wherein the grounding device includes a core and a plurality of conductive fibers coupled to the core and extending therefrom, wherein at least a portion of the plurality of conductive fibers are configured to electrically couple the rotating component with the stationary component such that an electrostatic charge on the rotating component is directed through the plurality of conductive fibers to the stationary component, wherein the grounding device is positioned such that the core contacts only the plurality of conductive fibers.

18. The method in accordance with claim 17, wherein positioning a grounding device comprises:
   positioning at least one bearing having an inner race and an outer race within a bore formed in a housing;
   positioning the grounding device within the bore proximate the at least one bearing such that said plurality of conductive fibers contact said inner race and at least one of said outer race and said housing.

19. The method in accordance with claim 17, wherein positioning a grounding device comprises positioning the grounding device such that at least one conductive fiber of the plurality of conductive fibers contacts at least one rotatable bearing.

20. The method in accordance with claim 17, wherein positioning a grounding device comprises positioning the core and the plurality of conductive fibers in a bore formed in the stationary component.

21. A grounding device for an electric machine having a rotating component and a stationary component, said grounding device comprising:
   a core comprising a first portion coupled to the stationary component and a second portion positioned within an opening defined by the rotating component; and
   a plurality of conductive fibers coupled to said second portion and extending therefrom, said plurality of conductive fibers configured to electrically couple the rotating component with the stationary component such that an electrostatic charge on the rotating component is directed through said plurality of conductive fibers to the stationary component.

22. A grounding device for an electric machine having a rotating component and a stationary component, said grounding device comprising:
   a core fabricated from an electrically non-conductive material; and
   a plurality of conductive fibers coupled to said core and extending therefrom, said plurality of conductive fibers configured to electrically couple the rotating component with the stationary component such that an electrostatic charge on the rotating component is directed through said plurality of conductive fibers to the stationary component.

23. An electric machine comprising:
   at least one rotatable bearing comprising an inner race and an outer race;
   a housing coupled to a ground, wherein said housing comprises a bore formed therein, wherein said at least one bearing and said grounding device are positioned within said bore; and
   a grounding device conductively coupled between said at least one rotatable bearing and said housing, wherein said grounding device comprises:
   a core; and
   a plurality of conductive fibers coupled to said core and extending therefrom, wherein said plurality of conductive fibers are configured to electrically couple said at least one rotatable bearing with said housing such that an electrostatic charge on said at least one rotatable bearing is directed through said plurality of conductive fibers to said housing, wherein said grounding device is positioned proximate said at least one bearing such that said plurality of conductive fibers contact said inner race and at least one of said outer race and said housing.

24. A method of assembling an electric machine, said method comprising:
   providing a rotating component;
   coupling a stationary component to a ground; and
   positioning a grounding device between the rotating component and the stationary component, wherein the grounding device includes a core and a plurality of conductive fibers coupled to the core and extending therefrom, wherein the grounding device is positioned such that at least one conductive fiber of the plurality of conductive fibers contacts at least one rotatable bearing, wherein at least a portion of the plurality of conductive fibers are configured to electrically couple the rotating component with the stationary component such that an electrostatic charge on the rotating component is directed through the plurality of conductive fibers to the stationary component.

* * * * *